(12) United States Patent
Forest et al.

(10) Patent No.: US 7,034,654 B2
(45) Date of Patent: Apr. 25, 2006

(54) MOTOR VEHICLE ENGINE IMMOBILIZER SECURITY SYSTEM AND METHOD

(75) Inventors: Thomas M. Forest, Macomb Township, MI (US); David T. Proefke, Madison Heights, MI (US); Axel Nix, Birmingham, MI (US); Marcelleaus P. Baines, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 249 days.

(21) Appl. No.: 10/756,729

(22) Filed: Jan. 13, 2004

(65) Prior Publication Data

US 2005/0151619 A1    Jul. 14, 2005

(51) Int. Cl.
*H04Q 9/00* (2006.01)
*B60R 25/00* (2006.01)
*G06F 7/58* (2006.01)
*H01H 47/00* (2006.01)

(52) U.S. Cl. ............. 340/5.26; 340/5.31; 340/5.72; 340/426.11; 708/250; 708/252; 307/10.7

(58) Field of Classification Search ............. 340/5.26, 340/5.72, 5.31, 426.11; 708/250, 252; 307/10.5
See application file for complete search history.

(56) References Cited

U.S. PATENT DOCUMENTS

| | | | | |
|---|---|---|---|---|
| 5,195,136 A | * | 3/1993 | Hardy et al. | 380/43 |
| 5,377,270 A | * | 12/1994 | Koopman et al. | 380/262 |
| 5,606,322 A | * | 2/1997 | Allen et al. | 341/173 |
| 5,670,933 A | * | 9/1997 | Hayashi | 340/426.12 |
| 5,886,421 A | * | 3/1999 | Mizuno et al. | 307/10.5 |
| 6,292,096 B1 | * | 9/2001 | Munch et al. | 340/445 |
| 6,617,961 B1 | * | 9/2003 | Janssen et al. | 340/5.8 |

* cited by examiner

*Primary Examiner*—Michael Horabik
*Assistant Examiner*—Scott Au
(74) *Attorney, Agent, or Firm*—Laura C. Hargitt

(57) ABSTRACT

Methods and apparatus are provided for insuring that a motor vehicle is being operated by an authorized operator. The apparatus includes an electronic control unit (ECU), an engine immobilizer unit, and a shared encryption key. The ECU generates a challenge by combining the output of a pseudo-random number generator and the output of a somewhat random number generator and cycling the combined number through a linear feedback shift register. The ECU sends the challenge to the immobilizer unit where it is encrypted with the shared key and sent back to the ECU as a response. The ECU uses the same key to encrypt the challenge and compares the encrypted challenge to the response. If the response matches the encrypted challenge, engine operation is enabled.

26 Claims, 3 Drawing Sheets

MOTOR VEHICLE ENGINE IMMOBILIZER SECURITY SYSTEM AND METHOD

TECHNICAL FIELD

The present invention generally relates to a motor vehicle security system, and more particularly relates to a challenge/response motor vehicle theft deterrent engine immobilizer system and method that generates a secure challenge to prevent an unauthorized entity from operating a motor vehicle.

BACKGROUND

Some motor vehicle security systems regulate operation of the vehicle's engine so that the engine operates only if a valid ignition key is provided in the vehicle ignition. One type of security system, a motor vehicle engine immobilizer system, offers this security by preventing the motor vehicle engine from operating fully unless the motor vehicle security system confirms that the user requesting engine operation is authorized to use the vehicle. Whenever an ignition request is made, the electronics system that governs engine operation checks to make sure this ignition request is made by an authorized user.

Recent vehicle immobilizer systems utilize a system known as "challenge/response" by which the engine electronics checks to make sure the user requesting engine starting is authorized to start the vehicle. One portion of the security system (the challenger) requests another portion of the system (the responder) to "prove" its identity. This proof is based on knowledge of secret information that is shared by the challenger and the responder.

In principle the challenge/response system is fairly simple. The challenger sends a message (the challenge) containing a random number to the responder. The responder takes the random number, performs some manipulation based on the shared secret, and returns the result (the response) to the challenger. The challenger performs the identical manipulation on the If the results match, the responder is deemed to have proven its identity to the challenger and vehicle operation is authorized.

In order for the challenge/response system to be secure, however, the challenge needs to change each time a challenge is sent and the challenge needs to be unpredictable. If the challenge does not change, the correct response would also not change. A potential thief, for example a parking valet in temporary authorized possession of the vehicle, who witnesses one response to the challenge would be able to replay the identical response at a later time and defeat the security system. In addition, if the challenge is predictable (for example, a counter which is simply incremented by one for each new challenge), a potential thief, again in temporary authorized possession of the vehicle, would be able to request the system to compute a response for a challenge that will be used in the near future or even for the set of all challenges that will be used in the near future. The thief would then already have the correct response for a future challenge and would be able to defeat the security of the system in the future.

In order to secure the system against such manipulation, the device that is acting as the challenger should use a random number generation technique to generate a sequence of changing, unpredictable numbers for the challenge. Ideally the number would be generated using a truly random number generator. Unfortunately, however, it is generally difficult to generate a truly random number. It is difficult to find an adequate source of randomness that would result in the number of independent random bits required for a secure challenge. To overcome this problem, immobilizer systems conventionally use pseudo-random number generation techniques to generate a sequence of numbers that have characteristics similar to a true random sequence. Pseudo-random number generators (PRNG's) make use of state information; the output of the generator (and possibly the evolution to the next state) are based on a series of operations based on the current state. The techniques underlying PRNG's are well known to those of skill in the art.

The PRNG, which can be, for example, a portion of the vehicle powertrain controller, generates a stream of continuously changing numbers that are (in theory) unpredictable as long as the potential attacker does not know the key used for the random number generation. The security of the PRNG, however, is only as good as the ability of the challenger to protect its state. If the attacker is able to force specific values of the state, the sequence of challenges will follow a predictable path. For example, if removing power to the powertrain controller or at least to the PRNG resulted in the PRNG state being reset to a fixed value such as all zeros, the system would be insecure. The attacker could simply cause the PRNG to reset, and then the sequence of challenges would be completely predictable. If the attacker can determine the predictable path, the correct responses to subsequent challenges can also be discerned and the security of the vehicle can be compromised. To overcome this weakness in the security system, it is conventional to store the state of the PRNG in non-volatile memory in the powertrain controller.

Even if the state information of the PRNG can be protected in non-volatile memory, it is still possible for a potential thief who has temporary authorized possession of the vehicle to exploit the security system. There are, for example, certain techniques that allow the powertrain controller to be modified such that the controller does not update its copy of the PRNG state variable on power down. With these modifications, the system will repeatedly generate the same challenges, thus allowing the security of the system to be defeated.

Accordingly, it is desirable to provide a motor vehicle engine immobilizer security system and a method for its operation that overcome the problems attendant with conventional immobilizer systems that are based solely on pseudo-random number generation. Further, it is desirable to provide a motor vehicle engine immobilizer security system and a method for its operation that can be implemented without requiring additional expensive hardware. Furthermore, other desirable features and characteristics of the present invention will become apparent from the subsequent detailed description and the appended claims, taken in conjunction with the accompanying drawings and the foregoing technical field and background.

BRIEF SUMMARY

The invention provides an apparatus for a motor vehicle engine immobilizer security system. Methods for use of the apparatus and for generating a secure number for use in the apparatus are also provided. The apparatus includes an electronic control unit (ECU), an engine immobilizer unit, a shared encryption circuit, and a shared encryption key. The ECU generates a challenge by combining the output of a pseudo-random number generator and the output of a somewhat random number generator and cycling the combined number through a linear feedback shift register. The ECU sends the challenge to the immobilizer unit where it is encrypted with the shared key and sent back to the ECU as a response. The ECU uses the same key and encryption circuit to encrypt the challenge and compares the encrypted challenge to the response. If the response matches the encrypted challenge, engine operation is enabled.

BRIEF DESCRIPTION OF THE DRAWINGS

The present invention will hereinafter be described in conjunction with the following drawing figures, wherein like numerals denote like elements, and wherein FIG. 1. schematically illustrates a theft deterrent engine immobilizer system in accordance with one embodiment of the invention.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

A motor vehicle engine immobilizer security system, in accordance with a preferred embodiment of the invention, uses a challenge/response process based on a secure challenge to prevent unauthorized users from gaining use of the motor vehicle engine. Because engine immobilizer systems that only utilize pseudo-random numbers are vulnerable to electronic manipulation, the apparatus and method in accordance with the invention generate a secure, difficult to replicate challenge message that utilizes true random numbers. Even if an unauthorized user succeeds in disabling or manipulating some of the engine electronics, the inventive immobilizer system is still able to produce random, non-sequential, numeric challenges that are difficult for an outside observer to decipher. The unpredictable numeric challenges created by the engine electronics are constructed by combining random bits from analog signals and/or timers in the motor vehicle with a pseudo-random number to generate a seed number. The seed number is then used as an input to a linear feedback shift register (LFSR) to mix the randomness of the bits in the seed number. The LSFR is cycled through a predetermined number of cycles to produce a secure number that can be used as the challenge in the challenge/response user authorization process. The mixing by the LFSR makes it difficult for unauthorized users, even those familiar with engine immobilizer systems and encryption techniques, to circumvent the security system.

Figure 1:
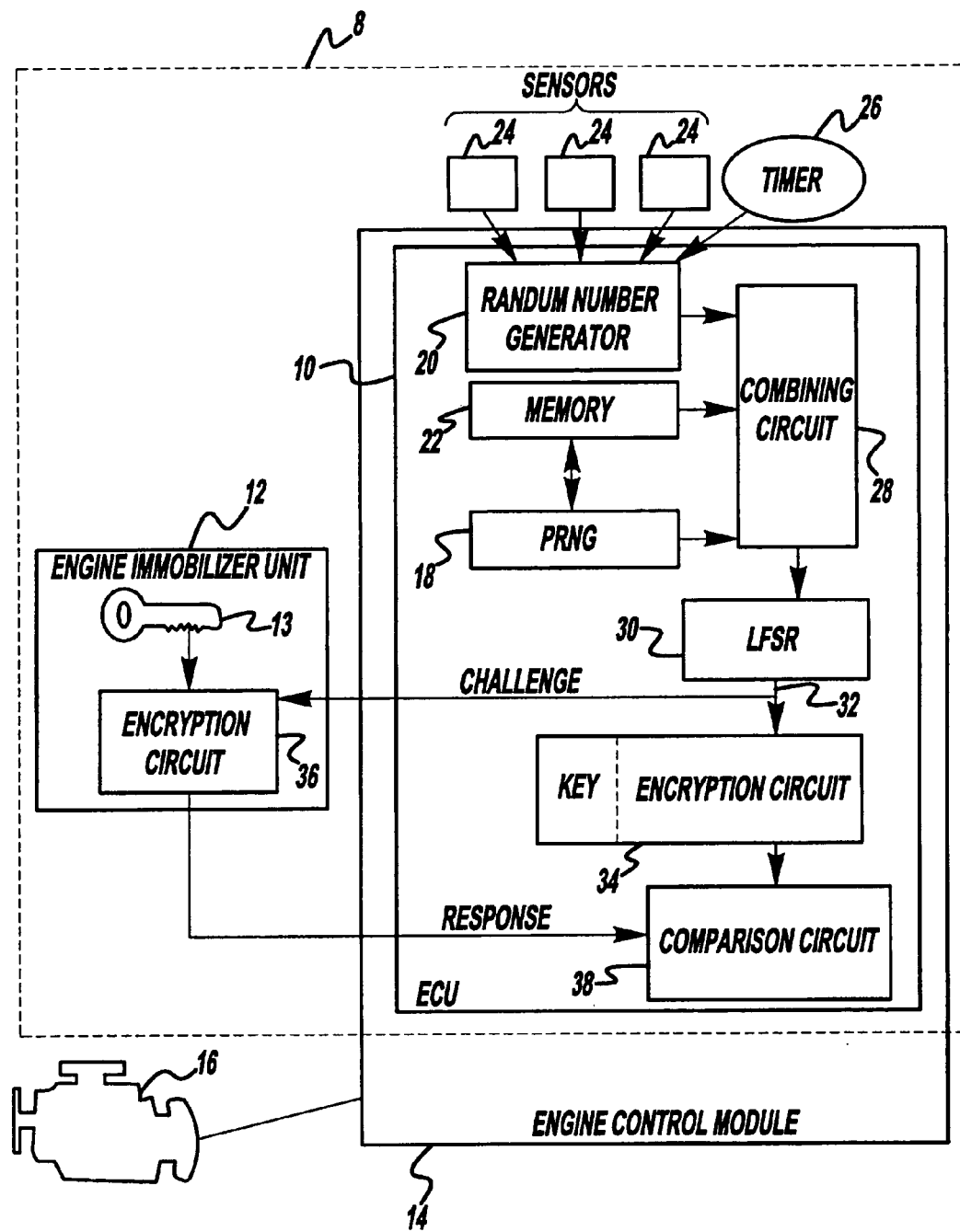

An engine immobilizer system 8 utilizing a challenge/response process in accordance with an embodiment of the invention is illustrated in FIG. 1. The engine immobilizer system includes an electronic control unit (ECU) 10 and an engine immobilizer unit 12. The ECU is configured to generate a secure challenge. The engine immobilizer unit is coupled to the ECU and is configured to receive the challenge and to generate and send a response to the challenge. The ECU and the engine immobilizer unit can be coupled by a local area network (LAN), or the like. The ECU is part of an engine control module 14 that controls the operation of engine 16. The engine immobilizer unit is configured to handle all ignition requests made by an intended driver of the motor vehicle. Engine immobilizer unit 12 includes an ignition key 13. Both electronic control unit 10 and engine immobilizer unit 12 can be stand alone processors, microcontroller units (MCU's), part of the motor vehicle electronics, or the like. Both the ECU and the engine immobilizer unit can be programmed in known manner to perform the functions to be described below.

Electronic control unit 10 includes a pseudo-random number generator (PRNG) 18. The PRNG can be implemented in either hardware or software in known manner. The actual form of the pseudo-random number generator is not important to the invention; any of a variety of known PRNG's may be employed. It is preferred, however that the PRNG is configured to generate a different output for each challenge/response cycle. For example, but without limitation, the PRNG can include a counter that increments the count each time a new challenge is generated. A pseudo-random number can then be created by passing the output of the counter or any other incrementable seed through a cryptographic function such as a keyed cryptographic hash function. The PRNG would thus produce a stream of numbers that changed with every challenge/response cycle. In accordance with one embodiment of the invention, the engine control module includes a memory 22 in which the value of the seed for the PRNG can be stored. Preferably memory 22 is a non-volatile memory such as FLASH memory, battery backed RAM, or the like. The PRNG can generate a pseudo-random number for use in generating a secure challenge each time there is an ignition request. Because the generation of the pseudo-random number may be a time consuming event, in accordance with a preferred embodiment of the invention, PRNG 18 generates a pseudo-random number in anticipation of an ignition request and stores that number in memory 22 so that a pseudo-random number is available when needed.

Engine control module 12 also includes a random number generator 20. Although it is difficult to generate a truly random number given the available sources of randomness in a motor vehicle, it is possible to create a set of "somewhat random" data, and such is the function, in accordance with the invention, of random number generator 20. Engine immobilization system 8 includes at least one analog sensor 24 and/or at least one fast running timer 26, the outputs of which are coupled to the random number generator. Conventional motor vehicle electronics include a plurality of such sensors and timers. For example, analog sensors are used for coolant temperature or manifold pressure and fast running timers are used for fuel injector control. These sensors and timers are used in the normal functioning and/or control of the motor vehicle and continuously report to the vehicle electronics the condition of the sensor or the time as a stream of bits. Many of the bits reported by each sensor or timer will be fixed from report to report, but at least a few of the bits will appear to be random. The output from only one sensor or one timer can be used as the random number to be included in the challenge, but because only a few bits may change from run to run, it is preferred to use the output from a plurality of sensors and/or timers. In accordance with one embodiment of the invention, the least significant bits from each of a plurality of sensors and/or timers are concatenated by random number generator 20 to generate a random number.

The output of PRNG 18 (or alternatively memory 22 if the pseudo-random number has been generated in advance and stored in memory 22) and the output of random number generator 20 are combined in a combining circuit 28. The combining circuit can be implemented in hardware or software, but will be referred to herein as a circuit. In accordance with one embodiment of the invention, combining circuit 28 is an exclusive OR (XOR) circuit. In accordance with a further embodiment of the invention, combining circuit 28 can be an encryption circuit such as a keyed cryptographic hash function. Combining circuit 28 serves to mix the bits of the pseudo-random number generated by PRNG 18 and the bits of the random number generated by random number generator 20 so that a potential thief, upon observing the output of the combining circuit, would have some difficulty predicting a future number to be output from the circuit. Although the number generated by the combining circuit contains some randomness, the level of randomness does not meet the level of security required for a secure engine immobilizer security system because the large proportion of fixed bits in this "somewhat random" data might make the mixing of the random data too obvious to a sophisticated outside observer.

In accordance with an embodiment of the invention, the number generated by combining circuit 28 is used as a seed, that is, a starting point, for computation by a linear feedback shift register (LFSR) 30. Using the number generated by the combining circuit as a starting point, the LSFR is cycled a fixed number of times to mix the randomness into the output and to hide any obvious structure of the mixed randomness from casual observation of the challenge. In a preferred embodiment of the invention, LFSR 30 is a maximal length linear feedback shift register. In accordance with a further embodiment of the invention, LFSR 30 is an n-bit linear feedback shift register and the fixed number of times through which the LFSR is cycled is equal to at least the length, n, of the shift register. The output 32 of the LFSR, after the cycling, is a secure number used as the challenge in the challenge/response system. LFSR 30 is relatively easy to implement in either hardware or software and thus can be implemented without undue expense. Use of a linear feedback shift register has the advantage that small changes to the input (i.e., changing only a few bits of the somewhat random number generated by combining circuit 28) results in a large change in the output (i.e., many bits of the secure number are changed). The relationship between the bits is not obvious under casual inspection although it might be evident from a rigorous mathematical analysis by one having knowledge of the LSFR function employed. If LFSR 30 is a maximal length linear feedback shift register, each unique starting number combination will result in a unique output of the secure number generator following cycling of the LSFR. Manipulation of the LFSR does not reduce the security of the inventive generator by reducing the number of possible outcomes. Even if a thief attacking the system has complete knowledge of the LFSR mechanism and is capable of rigorous mathematical analysis of the system, the system is still as secure as the number generated without the LFSR.

If a thief attacking the system is able to modify the challenge device such that it is unable to update its non-volatile state so that PRNG 18 generates a predictable number, the output of the challenge system will still be different from a previous challenge because of the somewhat random data used in random number generator 20. On casual inspection, the output of the LFSR, even in such circumstances, will be dramatically different from run to run, and will in most instances be sufficient to deter a would be thief attacking the system.

Electronic control unit 10 includes an encryption circuit 34 and engine immobilizer unit 12 includes a similar encryption unit 36. The two encryption units share a secret key. In the ECU, the secret key is embedded in encryption circuit 34. In the engine immobilizer unit, the shared key is embedded in ignition key 13. Output 32 of LFSR 30 is sent from ECU 10 to engine immobilizer unit 12 as a challenge in response to an ignition request. The challenge is operated upon by encryption circuit 36 using the shared key embedded in key 13 to generate a response that is sent back to ECU 10. Output 32 of LFSR 30 is also inputted to encryption circuit 34 where it is operated upon by the encryption circuit using the shared key. The output of encryption circuit 34 is compared in comparison circuit 38 in ECU 10 to the response sent by encryption unit 36 in engine immobilizer unit 12. If the response matches the output of encryption circuit 34, engine operation is authorized. If the response does not match the output of encryption circuit 34, the engine immobilizer system prohibits engine operation. The two encryption circuits and comparison circuit 38 can be implemented in either hardware or software.

Figure 2:
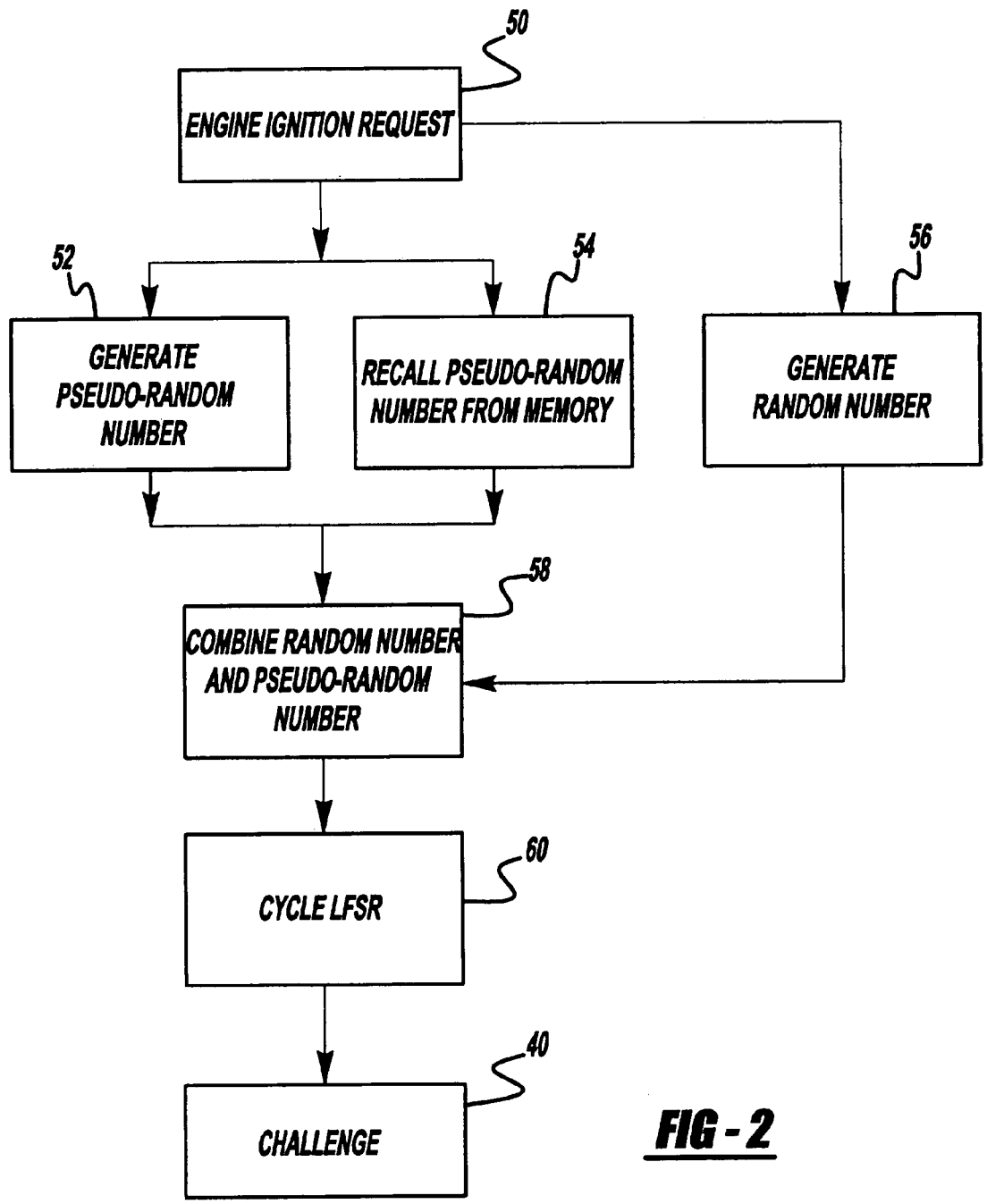
FIG. 2. illustrates, in flow chart form, a method for generating a secure number in accordance with an embodiment of the invention.

FIG. 2 illustrates, in flow chart form, a method for generating a secure number for use as a challenge in accordance with an embodiment of the invention. The process of generating a secure number for use as a challenge in a motor vehicle engine immobilizer security system can be understood by reference to FIG. 2 and with continued reference to FIG. 1. The process begins with receipt of an engine ignition request (step 50). The engine ignition request conventionally comes from inserting and turning an ignition key in the engine immobilizer unit. This causes an ignition request to be sent to the electronic control unit. An ignition request may also come from an unauthorized person attempting, for example, to hot wire the motor vehicle. Upon receipt of the ignition request, ECU 10 causes a pseudo-random number to be generated by PRNG 18 (step 52). In accordance with an alternate embodiment of the invention, a pseudo-random number can be generated by PRNG 18 in advance of the ignition request and the pseudo-random number so generated is stored in memory. In accordance with this embodiment of the invention, upon receipt of an ignition request, the pseudo-random number is recalled from memory (step 54). The operation of pseudo-random number generators is well known and need not be explained here. For completeness, however, the operation of one such generator will be explained briefly. In response to or in anticipation of an ignition request a counter is incremented and the incremented count is stored in memory 22. The output of the counter is used as a seed and is run through a keyed cryptographic hash function to generate the pseudo-random number. Because the counter increments each time a challenge is generated, a different pseudo-random number is generated for each challenge/response cycle. Also in response to receipt of an ignition request, random number generator 20 generates a random number (step 56). Random number generator 20 generates a random number from the least significant bits of at least one analog sensor 24 and/or timer 26 that regularly reports data to the engine control module. In a preferred embodiment of the invention, random number generator 20 generates a random number by concatenating the least significant bits from a number of analog sensors and/or fast running timers. As a specific but non limiting example, if PRNG 18 generates a pseudo-random number of 32 bit length, random number generator 20 generates a random number of 32 bit length. The random number can be generated, for example, by concatenating the 8 least significant bits from each of four analog sensors and/or fast running timers.

The numbers generated by PRNG 18 (whether generated concurrently or generated in advance and stored in memory) and the number generated by random number generator 20 are combined in combining circuit 28 (step 58). In accordance with a preferred embodiment of the invention, combining circuit 28 performs an exclusive OR function on the pseudo-random number and the random number. In accordance with an alternative embodiment of the invention, combining circuit 28 can be, for example, an encryption function such as a key encryption hash function. Use of an encryption algorithm to effect the combining can produce a more secure challenge because the encryption algorithm will generally be more difficult to reverse than would a simple exclusive OR function. Although such an encryption function increases the security of the challenge generated, it is generally more expensive to implement and more time consuming to operate.

The output of combining circuit 28 is used as the input seed for a linear feedback shift register 30 which is cycled a predetermined number of times (step 60) to produce a secure number 40 for use as a challenge. Preferably the predetermined number of times that the linear feedback shift register is cycled is at least equal to the length of the LFSR.

Figure 3:
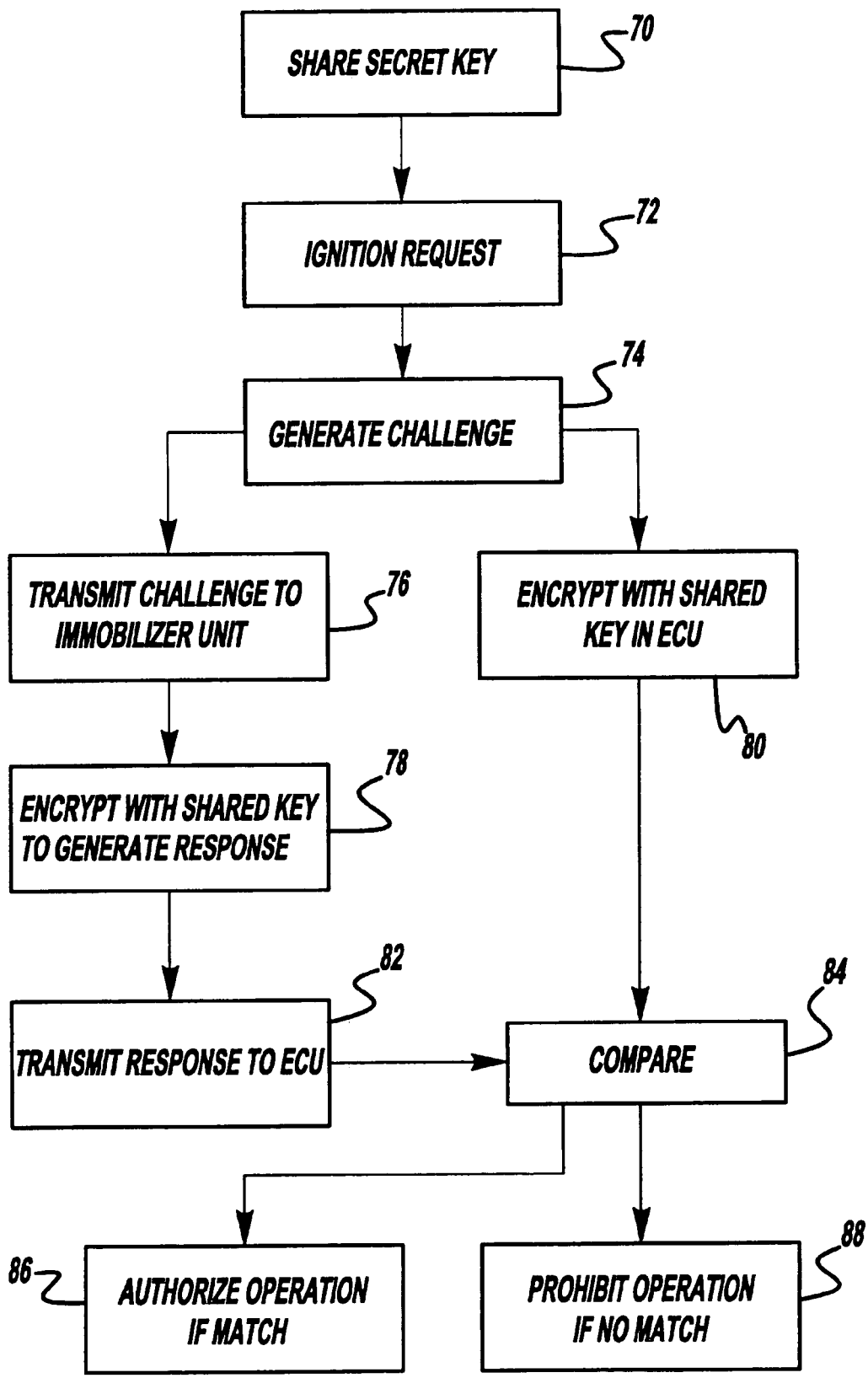
FIG. 3. illustrates, in flow chart form, a method for operating a theft deterrent engine immobilizer system in accordance with a further embodiment of the invention.

FIG. 3 illustrates, in flow chart form, a method for operating an engine immobilizer security system in a motor vehicle in accordance with an embodiment of the invention. The process of operating the engine immobilizer security system can be understood by reference to FIG. 3 and with continued reference to FIGS. 1 and 2. The engine immobilizer security system is initially prepared by providing a secret key that is shared (step 70) between two portions of the security system. In accordance with one embodiment of the invention the shared key is embedded in an electronic control unit (part of an engine control module) and also in an ignition key that is part of an engine immobilizer unit. The shared key can be embedded in both components, for example, at the time of manufacture. In a preferred embodiment the shared key is unique to a particular motor vehicle and the shared key for each motor vehicle is different. In response to an ignition request (step 72), the electronic control unit generates a challenge message (step 74). In accordance with one embodiment of the invention the challenge message is generated in the manner illustrated in FIG. 2. The challenge message is transmitted from the electronic control unit to the engine immobilizer unit (step 76). Within the engine immobilizer unit the challenge message received from the electronic control unit is encrypted using the shared secret key that is embedded in the ignition key to generate a response message (step 78). The challenge message generated is also encrypted by the electronic control unit using the shared secret key embedded therein (step 80). The response message is transmitted to the electronic control unit (step 82) where it is compared to the challenge message that has been encrypted by the electronic control unit (step 84). If the comparison determines that the response message is the same as the challenge message that has been encrypted by the electronic control unit, the vehicle operator is deemed to have proven his identity and engine operation is authorized (step 86). If the comparison determines that the response message is not the same as the challenge message that has been encrypted by the electronic control unit, the vehicle operator is deemed to be unauthorized and engine operation is prohibited (step 88).

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A method for generating a secure number for use in a motor vehicle security system, the method comprising the steps of:
 generating a pseudo-random number;
 generating a first number comprising a plurality of bits, at least some of the plurality of bits being random;
 combining the pseudo-random number and the first number to form a seed number; and
 generating a secure number by cycling a linear feedback shift register having the seed number as an input.

2. The method of claim 1 wherein the step of generating a first number comprises the step of generating a first number comprising least significant bits generated by at least one motor vehicle sensor.

3. The method of claim 2 wherein the step of generating a first number comprises the step of generating a first number comprising least significant bits generated by a plurality of motor vehicle analog sensors.

4. The method of claim 3 wherein the step of generating a first number comprises the step of concatenating the least significant bits generated by the plurality of motor vehicle analog sensors.

5. The method of claim 1 wherein the step of generating a first number comprises the step of generating a first number comprising least significant bits of a motor vehicle timer.

6. The method of claim 5 wherein the step of generating a first number comprises the step of concatenating least significant bits generated by at least one motor vehicle sensor and the least significant bits generated by the motor vehicle timer.

7. The method of claim 1 wherein the step of combining comprises the step of exclusive ORing the pseudo-random number and the first number.

8. The method of claim 1 wherein the step of combining comprises the step of combining the pseudo-random number and the first number using a keyed cryptographic hash function.

9. The method of claim 1 wherein the step of generating a secure number comprises the step of cycling a maximal length linear feedback shift register.

10. The method of claim 1 wherein the step of generating a secure number comprises the step of cycling an n-bit linear feedback shift register n times.

11. A method for operating an engine immobilizer security system in a motor vehicle having an engine immobilizer unit and an electronic control unit, and wherein a code secret is shared between the engine immobilizer circuit and the electronic control unit, the method comprising the steps of:
 generating a seed number by combining a pseudo-random number and a number comprising a plurality of random bits;

generating a secure number by cycling the seed number through a linear feedback shift register;

transmitting the secure number from the electronic control unit to the engine immobilizer unit;

performing an operation on the secure number using the shared secret in the engine immobilizer unit to generate a first modified number;

performing an operation on the secure number using the shared secret in the electronic control unit to generate a second modified number;

comparing the first modified number and the second modified number; and authorizing engine operation only if the first modified number is the same as the second modified number.

12. The method of claim 11 further comprising the step of storing the pseudo-random number in a non-volatile memory.

13. The method of claim 12 comprising the step of generating the pseudo-random number in response to an ignition request.

14. The method of claim 12 comprising the step of generating the pseudo-random number prior to an ignition request.

15. The method of claim 11 wherein the step of sharing a code secret comprises the step of sharing an encryption key and wherein the steps of performing an operation on the secure number comprise performing an encryption operation on the secure number using the encryption key.

16. The method of claim 11 wherein the step of generating a seed number comprises the step of generating a number comprising least significant bits from a plurality of analog motor vehicle sensors.

17. The method of claim 16 wherein the step of generating a seed number comprises the step of exclusive ORing the pseudo-random number and the number comprising least significant bits from a plurality of analog motor vehicle sensors.

18. The method of claim 16 wherein the step of generating a seed number comprises the step of combining the pseudo-random number and the number comprising least significant bits from a plurality of analog motor vehicle sensors using a keyed cryptographic hash function.

19. The method of claim 11 wherein the step of generating a secure function comprises the step of cycling the seed number through a maximal length linear feedback shift register.

20. An engine immobilizer security system for a motor vehicle comprising:

an electronic control unit comprising:

a pseudo-random number generator;

a random number generator configured to generate a number having a plurality of random bits by concatenating least significant bits from a plurality of motor vehicle sensors;

combining circuitry configured to combine an output from the pseudo-random number generator and an output from the random number generator to form a seed number;

a linear feedback shift register coupled to receive the seed number as an input and configured to cycle a predetermined number of times to generate a challenge number;

a first encryption unit coupled to receive the challenge number and configured to perform an encryption operation on the challenge number to generate an encrypted challenge number; and a comparison unit;

an engine immobilizer unit coupled to the electronic control unit and comprising;

a receiver coupled to receive the challenge number from the electronic control unit; and a second encryption unit coupled to receive the challenge number and configured to perform an encryption operation on the challenge number to generate a response number;

a shared encryption key for use by the first encryption unit and the second encryption unit; and wherein the comparison unit is configured to compare the response number to the encrypted challenge number and wherein the electronic control unit is configured to allow engine operation of the motor vehicle only if the response number is the same as the encrypted challenge number.

21. The engine immobilizer security system of claim 20 wherein the pseudo-random number generator comprises an incrementable counter configured to increment each time an ignition request is received by the electronic control unit.

22. The engine immobilizer security system of claim 21 further comprising a non-volatile memory configured to store the output of the pseudo-random number generator.

23. The engine immobilizer security system of claim 20 wherein the combining circuitry comprises exclusive ORing circuitry.

24. The engine immobilizer security system of claim 20 wherein the combining circuitry comprises a keyed encryption hash function.

25. The engine immobilizer security system of claim 20 wherein the linear feedback shift register comprises an n-bit linear feedback shift register configured to cycle at least n times.

26. The engine immobilizer security system of claim 20 wherein the linear feedback shift register comprises a maximal length linear feedback shift register.

* * * * *